(12) United States Patent
Sfar

(10) Patent No.: US 9,282,486 B2
(45) Date of Patent: Mar. 8, 2016

(54) COMMUNICATION IN A CELLULAR NETWORK TAKING INTO ACCOUNT BACKHAUL LOADING

(75) Inventor: Safouane Sfar, Nuremberg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 133 days.

(21) Appl. No.: 14/345,131

(22) PCT Filed: Sep. 13, 2012

(86) PCT No.: PCT/EP2012/067975
§ 371 (c)(1),
(2), (4) Date: Mar. 14, 2014

(87) PCT Pub. No.: WO2013/037903
PCT Pub. Date: Mar. 21, 2013

(65) Prior Publication Data
US 2014/0248897 A1    Sep. 4, 2014

Related U.S. Application Data

(60) Provisional application No. 61/552,034, filed on Oct. 27, 2011.

(30) Foreign Application Priority Data

Sep. 16, 2011    (EP) ..................................... 11306173

(51) Int. Cl.
*H04W 28/08*    (2009.01)
*H04L 12/911*   (2013.01)
*H04W 28/24*    (2009.01)

(52) U.S. Cl.
CPC ............. *H04W 28/08* (2013.01); *H04L 47/824* (2013.01); *H04W 28/24* (2013.01)

(58) Field of Classification Search
CPC . H04W 28/08; H04W 28/02; H04W 28/0231; H04W 28/0242; H04W 28/0247; H04W 28/0268; H04W 28/0278; H04W 28/0284; H04W 28/0289; H04W 16/08; H04W 28/16; H04W 28/12; H04W 28/0273; H04W 28/10; H04W 28/00; H04W 72/04; H04W 72/0486; H04W 92/00; H04W 92/12; H04W 92/24; H04W 28/24; H04L 47/824; H04L 47/726; H04L 47/122; H04L 47/125
See application file for complete search history.

(56) References Cited

U.S. PATENT DOCUMENTS 7,640,020 B2 *  12/2009  Gutowski ............ H04L 41/0896
                                                           455/452.2
8,243,679 B1 *   8/2012  Huang ................. H04W 36/30
                                                              370/331
(Continued)

FOREIGN PATENT DOCUMENTS

GB        2454872 A    5/2009

*Primary Examiner* — Meless Zewdu
(74) *Attorney, Agent, or Firm* — Coats & Bennett, P.L.L.C.

(57) ABSTRACT

The invention deals with a method of communication in cellular networks comprising mobile user equipments (1, 2, 3, 4), base stations (5, 6, 7, 8) and core networks (9, 10), backhauls (1, 12, 13, 14, 15) between base stations (5, 6, 7, 8) and core networks (9, 10), including, if a request from or to a mobile user equipment (4) cannot be satisfied by a base station (6) of a first network through own backhaul according to traffic load thereon, the step of trying to satisfy said request through backhaul of another neighbor base station (8) of a second network different from first network, said another neighbor base station (8) being selected according at least to availability and to offered quality of service thereof.

14 Claims, 3 Drawing Sheets

(56) References Cited

U.S. PATENT DOCUMENTS

| | | | | |
|---|---|---|---|---|
| 8,422,424 B1 * | 4/2013 | VonFeldt | ............ | H04W 24/02 370/328 |
| 8,559,957 B2 * | 10/2013 | Hunzinger | ........ | H04W 36/0083 455/437 |
| 2007/0177510 A1 * | 8/2007 | Natarajan | ............ | H04W 36/22 370/238 |
| 2008/0261602 A1 | 10/2008 | Livneh | | |
| 2009/0270109 A1 | 10/2009 | Wang et al. | | |
| 2010/0215001 A1 * | 8/2010 | Russell | ................ | H04L 63/062 370/329 |
| 2011/0151877 A1 * | 6/2011 | Tafreshi | ................ | H04W 36/18 455/442 |
| 2011/0292895 A1 * | 12/2011 | Wager | ................... | H04L 5/0007 370/329 |

* cited by examiner

COMMUNICATION IN A CELLULAR NETWORK TAKING INTO ACCOUNT BACKHAUL LOADING

FIELD OF THE INVENTION

The invention relates to communication in a cellular network in which backhaul loading is taken into account to limit the risk of traffic congestion.

BACKGROUND OF THE INVENTION

In a conventional cellular system, whatever generation is considered, a base station has at least two interfaces, an air interface to mobile user equipment (UE) and a backhaul interface to the core network.

In a cellular network, the backhaul portion of the network comprises the intermediate links between the core network, or backbone, of the cellular network and the small subnetworks at the "edge" of the entire cellular network. For example, while mobile user equipments communicating with a single base station constitute a local subnetwork, the connection between the base station and the rest of the world begins with a backhaul link to the core network of cellular network.

With more and more expectations coming from mobile user equipments, with respect to geographical coverage, available bandwidth, and quality of service level, that is to say with a continuous increase in user demand, traditional backhaul can be easily overloaded, thereby creating a backhaul bottleneck because of insufficient backhaul capacities.

A solution that could strike one's mind is to increase backhaul capacities in a limitless way in order to meet user's demand increase. But upgrading network infrastructure rapidly raises capital and operational expenditures to a non acceptable level for telecommunication operators.

In a first prior art, for example described in English application GB 2454872, a solution to this problem is proposed. When backhaul traffic load becomes too high, corresponding base station of the network merely refuses new entering calls and a handover to a neighbor base station of the same network is managed. A new link is set up between new neighbor base station and mobile user equipment. This can only be done when there is at least one neighbor base station available in the network.

SUMMARY OF THE INVENTION

An object of some embodiments of the present invention is to alleviate at least partly the above mentioned drawbacks.

More particularly, embodiments of the invention aim to make processing simpler and more mobile user equipment transparent, when own backhaul traffic load of a base station in a network is too high to satisfy a new request from or to a mobile user equipment.

A preferred embodiment of the invention aims at making such processing completely transparent for mobile user equipment, that is to say with no interaction from mobile user equipment, with no cell change for the mobile user equipment, with no request relayed to another base station to trigger the backhaul change. To trigger the backhaul change, there is signaling only between base station and core network according to some embodiments of the invention.

When there are several different networks in a same geographical area, when base stations belonging to different networks are neighbor to one another in this same geographical area, it may happen that all different networks are not equally loaded. For example, a first network backhaul is close to traffic overload whereas a second network has major part of its backhaul capacities still traffic free and therefore available. It is within the scope of invention to take advantage of these yet unused backhaul capacities of second network to limit or to reduce the risk of backhaul traffic overload in the first network.

In a first aspect, this object is achieved with a method of communication in a cellular communication network comprising mobile user equipments, base stations and a core network. The method includes the successive steps of:
   a) main base station of a first cellular network receiving a request from or to a mobile user equipment of the first network;
   b) main base station checking if request can be satisfied through own backhaul according to traffic load;
wherein, if request cannot be satisfied trough own backhaul, method further includes the successive steps of:
   c) main base station or core network of first network trying to select another neighbour base station of at least a second cellular network different from first network, according at least to availability of a backhaul of said another neighbour base station and/or to offered quality of service of the backhaul of said another neighbour base station;
   if successful, main base station communicating through backhaul between said another neighbour base station of second network and core network of first network to satisfy request.

Preferred embodiments comprise one or more of the following features:

In step d), the main base station may communicate with said another neighbour base station of the second network through air interface and may communicate with the core network of the first network through backhaul between said another neighbour base station of second network and core network of the first network via a core network of the second network, to satisfy request.

In step d), the main base station may communicate with said another neighbour base station of second network through air interface, acting as a user equipment of the second network.

In step b), the main base station may check if request can be satisfied through own backhaul by comparing effective traffic load to a predetermined maximum traffic load threshold.

In step c), the main base station or the core network of the first network may try to select another neighbour base station of at least a second network by choosing in a list of available neighbour base stations of at least a second network with associated offered qualities of service.

In step c), the main base station or the core network of the first network may try to select another neighbour base station of at least a second network by choosing, in the list of available neighbour base stations of at least a second network with associated offered qualities of service, the available neighbour base station with the best quality of service.

In step c), the main base station or the core network of the first network may try to select another neighbour base station of at least a second network by requiring acceptance of said mobile user equipment, if quality of service of neighbour base station intended to be chosen is below the minimum quality of service required by the request to be satisfied.

In a second aspect of the invention, a method is provided of communication in cellular networks comprising mobile user equipments, base stations and core networks, backhauls between base stations and core networks. The method includes, if a request from or to a mobile user equipment cannot be satisfied by a base station of a first network through own backhaul according to traffic load thereon, the step of trying to satisfy said request through backhaul of another neighbour base station of a second network different from first network, said another neighbour base station being selected according at least to availability of the backhaul there of and/or to offered quality of service of the backhaul thereof.

In a third aspect of the invention a main base station is provided of a main cellular network comprising mobile user equipments, base stations and a core network. The main base station comprises:

a) a receiver adapted to receive a request from or to a mobile user equipment;

b) a traffic load detector adapted to check if request can be satisfied through own backhaul according to traffic load;

c) a selector, adapted to try and select another neighbour base station of at least another cellular network according at least to availability and to offered quality of service of said another neighbour base station, if request cannot be satisfied trough own backhaul;

d) a transmitter and the receiver, both adapted to communicate through backhaul between said another neighbour base station of said another cellular network and core network of main cellular network to satisfy request, if selection successful.

In some embodiments, the main base station is an eNodeB of a E-UTRAN.

In a fourth aspect a subsystem is provided of a main core network of a main cellular network comprising mobile user equipments, base stations and the main core network. The subsystem comprises:

a) a receiving element adapted to receive a demand from a base station;

b) a fetching element adapted to get a list of available neighbour base stations and associated offered qualities of service of at least another cellular network;

c) a transmitting element adapted to send said list to said base station of main cellular network as an answer to said demand;

d) a selector, adapted to try and select another neighbour base station in said list.

The receiving element and the transmitting element are adapted to communicate afterwards with said base station of main cellular network through backhaul between main core network and one base station selected from said list.

The transmitting element and the selector are configured such that either operation of transmitting element sending said list or operation of selector trying to select said another neighbour base station can be performed, but both operations cannot be performed for the same demand.

In some embodiments, the subsystem is a serving gateway of a E-UTRAN.

In some embodiments, the fetching element is configured to be able to get said list from a OAM center.

A fifth aspect of the invention is a mobile user equipment for a main cellular network comprising mobile user equipments, base stations and a core network. The mobile user equipment comprises:

a) a transmitter adapted to transmit a request to a base station;

b) a receiver adapted to receive a quality of service degradation proposal from a base station according to excessive traffic load on backhaul of said base station;

c) a controller adapted to check if said degradation proposal is acceptable for said request.

The transmitter is adapted to send an acceptance message or a refusal message depending on checking result of controller.

A sixth aspect of the invention is a computer program product comprising a computer readable medium, having thereon a computer program comprising program instructions, the computer program being loadable into a data-processing unit and adapted to cause execution of the method according to the first or second aspect when the computer program is run by the data-processing unit.

According to an embodiment of the invention, in selection step, when a neighbour base station of at least a second network accepts to share its backhaul with main base station of first network, said neighbour base station of second network gives priority to requests from or to mobile user equipments of second network over the request to be satisfied by main base station of first network.

According to an embodiment of the invention, first network is E-UTRAN and at least second network is chosen among one or more of following networks: GSM network, UTRAN, WIFI network.

According to an embodiment of the invention, said request is either a file download request from said mobile user equipment or a request to establish a path for a terminating call to said mobile user equipment.

In some embodiments, the third, fourth, fifth and sixth aspects of the invention may additionally have features identical with or corresponding to any of the various features as explained above for the first aspect of the invention.

Further features and advantages of the invention will appear from the following description of embodiments of the invention, given as non-limiting examples, with reference to the accompanying drawings listed hereunder.

DETAILED DESCRIPTION OF THE INVENTION

Figure 1:
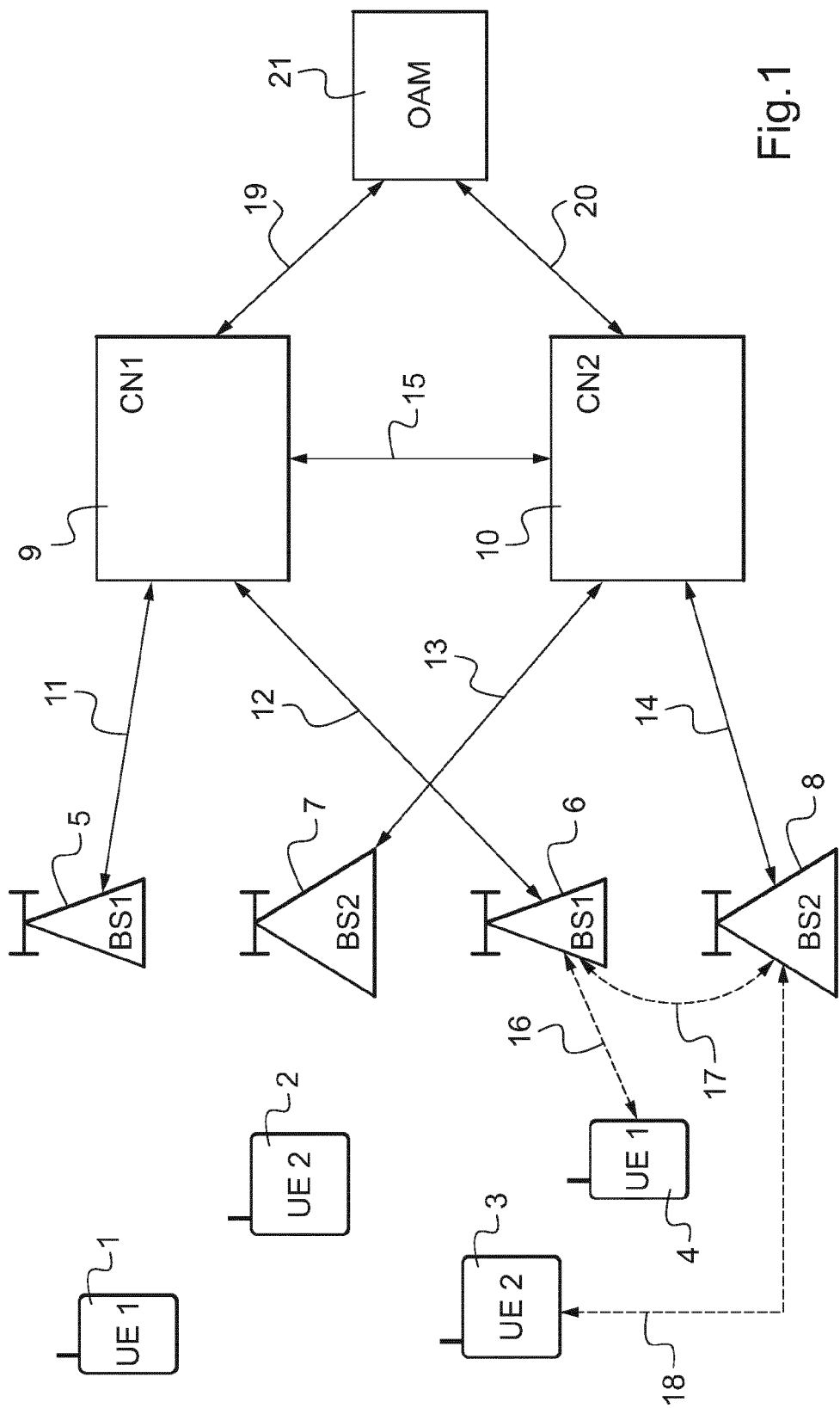
FIG. 1 shows an example of a couple of cellular networks implementing an embodiment of the invention.

FIG. 1 shows an example of a couple of cellular networks implementing an embodiment of the invention. There are two networks represented on FIG. 1, but there could be three of them or even more of them.

First network encompasses a core network 9, base stations 5 and 6, only two of them being represented on FIG. 1 but there may be more of them and mobile user equipments 1 and 4, only two of them being represented on FIG. 1 but there may be more of them. Base stations 5 and 6 communicate with core network 9, respectively through links 11 and 12. Link 11 is the backhaul between base station 5 and core network 9. Link 12 is the backhaul between base station 6 and core network 9. Core network 9 communicates through link 19 with an operation, administration and maintenance center 21.

The operation, administration and maintenance center 21 will provide base station 6 with a list of available neighbor base stations of a second network with associated offered qualities of service for their associated backhauls. In the list, each available neighbor base station is associated with its offered quality of service of its dedicated backhaul. Mobile user equipments 1 and 4 can communicate with base stations 5 and 6 through air interface. On FIG. 1, mobile user equipment 4 has established a communication 16 through air interface with base station 6. Mobile user equipment 4 has sent a request to base station 6 or base station 6 has got a request that is to be sent to mobile user equipment 4. First network can, for example, be an E-UTRAN network. Base stations 5 and 6 can be eNodeB. An E-UTRAN (Enhanced Universal Terrestrial Radio Access Network) is a network also called long term evolution (LTE) UTRAN. First network could also be a GSM, a UTRAN, or a WIFI network.

Second network encompasses a core network 10, base stations 7 and 8, only two of them being represented on FIG. 1 but there may be more of them, and mobile user equipments 2 and 3, only two of them being represented on FIG. 1 but there may be more of them. Base stations 7 and 8 communicate with core network 10, respectively through links 13 and 14. Link 13 is the backhaul between base station 7 and core network 10. Link 14 is the backhaul between base station 8 and core network 10. Core network 10 communicates through link 20 with an operation, administration and maintenance center 21. Mobile user equipments 2 and 3 can communicate with base stations 7 and 8 through air interface. Second network can be a GSM (Global System for Mobile communications), UTRAN, E-UTRAN, or WIFI (Wireless Fidelity) network. Base stations 7 and 8 can be corresponding base stations, that is to say a 2G base station, a nodeB, eNodeB, Home eNodeB, or a WIFI base station.

On FIG. 1, through link 12, base station 6 of first network has asked core network 9 of first network for backhaul resource support. Core network 9 of first network or base station 6 of first network managed to find base station 8 of second network as available and as providing sufficient quality of service for its backhaul to satisfy request of mobile user equipment 4 of first network.

On FIG. 1, base station 6 of first network has established a communication 17 through air interface with base station 8 of second network, base station 6 of first network acting as a mobile user equipment of second network, that is to say acting as would act mobile user equipments 2 or 3, or at least in a similar way. By this communication 17, base station 6 of first network asks base station 8 of second network for backhaul resource support. The backhaul between base station 8 of second network and core network 9 of first network includes links 14 and 15 and goes through core network 10 of second network.

So base station 6 of first network, instead of satisfying request coming from or to mobile user equipment 4 of first network by communicating with core network 9 of first network through link 12 which is the own backhaul of base station 6, will satisfy request coming from or to mobile user equipment 4 of first network by communicating with core network 9 of first network first through air interface (communication 17) with base station 8 of second network, then through links 14 and 15, that is to say through backhaul between base station 8 of second network and core network 9 of first network. So base station 6 of first network, having too much traffic load on own backhaul, will use a new backhaul which is backhaul of base station 8 of second network.

On FIG. 1, mobile user equipment 3 now tries to establish a communication 18 through air interface with base station 8, after communications 16 and 17 have been established. If base station 8 of second network is far from being overloaded, it can deal with mobile user equipment 3 of second network. Whereas, if, on the contrary, base station 8 of second network is close to being overloaded, it cannot deal directly with mobile user equipment 3 of second network. In some embodiments, base station 8 of second network must first terminate backhaul sharing with base station 6 of first network, before being able to deal with request of mobile user equipment 3 of second network, which later request may have priority over former requests coming from first network according to some embodiments of the invention.

Figure 2:
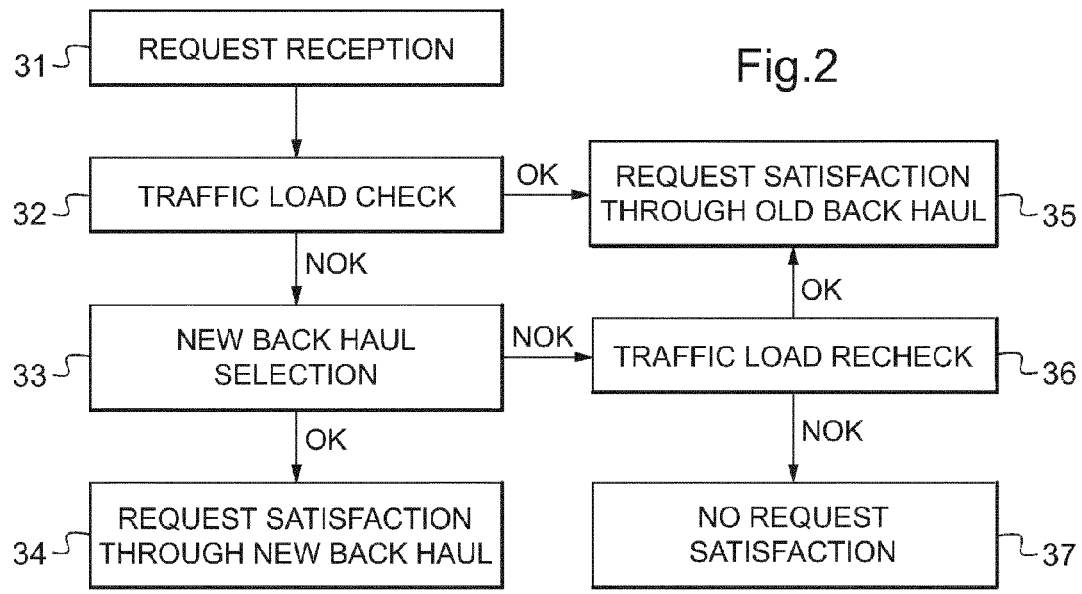
FIG. 2 shows the steps of an example of method implementing an embodiment of the invention.

FIG. 2 shows the steps of an example of method implementing an embodiment of the invention. This method comprises a "request reception" step 31, a "traffic load check" step 32, a "new backhaul selection" step 33, a "request satisfaction through new backhaul" step 34, a "request satisfaction through old backhaul" step 35, a "traffic load recheck" step 36, and a "no request satisfaction" step 37. Depending on circumstances, only part of method steps can be performed for a same request. Base station 6 will from now on often be called main base station 6, simply because it is the base station that is considered to receive the request to be satisfied. Later on, another base station, like for example base station 5, could be called main base station if it receives a request to be satisfied.

In step 31, the main base station 6 of first network receives a request from or to the mobile user equipment 4 of the first network. For example, a request from the mobile user equipment 4 can be a file download request, whereas a request to the mobile user equipment 4 can be a request to establish a path for a terminating call to said mobile user equipment 4, this request coming from another mobile user equipment, either from first or second network, through network core 9 of first network. Once step 31 is performed, we go to step 32.

In step 32, the main base station 6 checks if request can be satisfied through own backhaul according to traffic load. There are two alternatives. Either it can be satisfied though own backhaul, or it cannot. If it can, "OK" option, then the request is satisfied through own backhaul of main base station 6 in step 35, and here ends the performing of the method. If it cannot, "NOK" option, then we go to step 33.

In step 32, in a preferred embodiment, the main base station 6 checks if request can be satisfied through own backhaul by comparing effective traffic load to a predetermined maximum traffic load threshold. Use of a maximum traffic load threshold helps anticipating overload and avoiding breakdown of main base station traffic load.

Preferably, this predetermined maximum traffic load threshold is below 100% of own backhaul total capacities in order to limit risk of congestion of own backhaul. Preferably, this predetermined maximum traffic load threshold ranges from 60% to 90% of own backhaul total capacities. More preferably, this predetermined maximum traffic load threshold ranges from 70% to 80% of own backhaul total capacities.

In step 33, main base station 6 or core network 9 of first network try to select another neighbour base station of second network, according at least to availability and/or to offered quality of service of said another neighbour base station.

When the request is a file down load request from mobile user equipment 4, then said another neighbour base station of second network, according at least to availability and to offered quality of service of said another neighbour base station, is preferably selected by main base station 6 of first network. More generally speaking, this applies when the request comes from mobile user equipment 4 to main base station 6 according to some embodiments.

When said request is a request to establish a path for a terminating call to mobile user equipment 4, then said another neighbour base station of second network, according at least to availability and to offered quality of service of said another neighbour base station, is preferably selected by core network 9 of first network. More generally speaking, this applies when the request comes to mobile user equipment 4 from main base station 6 or simply forwarded by main base station 6 according to some embodiments.

The selection in step 33 may be done according to a strategy. An example of such a strategy will be detailed in FIG. 4. Anyway, here again, there are two alternatives. Either selection of another base station of second network is successful, or it is not successful. If it is successful, we go to step 34. If it is not successful, we go to step 36.

If selection is not successful, in step 36, main base station 6 of first network may still try and use own backhaul, provided that is possible, even if effective traffic load is above maximum traffic load threshold. That can be done, because often, the maximum traffic load threshold is not an "absolute" maximum traffic load threshold; indeed, the maximum traffic load threshold includes a margin.

In an alternative embodiment, if selection is unsuccessful, the main base station 6 may still try and use own backhaul, even if effective traffic load is above maximum traffic load threshold, provided effective traffic load is still below a very maximum traffic load threshold, the very maximum traffic load threshold being higher than the maximum traffic load. By way of example, the very maximum traffic load threshold can range from 90% to 99% of own backhaul total capacities. So this very maximum traffic load threshold still includes a margin, but a much smaller one than the maximum traffic load threshold.

Anyway, if in the end, either own backhaul of main base station 6 of first network can still be used (with a smaller margin than in step 32 of course) or it definitely cannot be used. If it still can be used, then we go to step 35, already known. If it definitely cannot be used, then we go to step 37.

In step 37, nothing is done for satisfying the request which simply cannot be satisfied at that time, except from waiting for own backhaul traffic load reduction. In another embodiment, in a more classical way, then handover can be used, with its drawbacks already discussed. In yet another embodiment, from time to time, main base station 6 can ask core network 9 of first network for an updated list of available neighbour base stations of at least a second network, hoping that the traffic load situation has changed. Some of preceding embodiments can be used in combination.

If selection in step 33 is successful, in step 34, main base station 6 communicates through backhaul between said another neighbour base station 8 of second network and core network 9 of first network to satisfy request. This communication to satisfy request will be detailed in FIG. 3.

Figure 3:
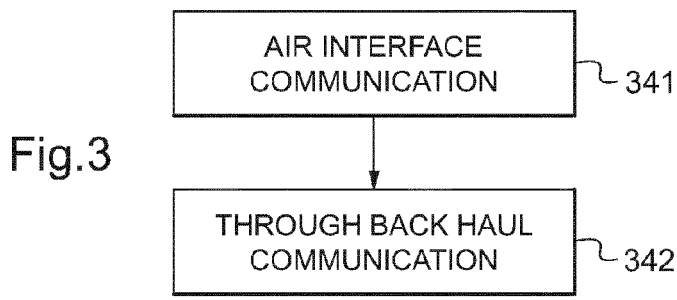
FIG. 3 shows an example of detailed substeps of a step of method shown on FIG. 2.

FIG. 3 shows an example of detailed substeps of a step of method shown on FIG. 2. Step 34 of FIG. 2 may comprise two substeps, an "air interface communication" substep 341 and a "through backhaul communication" substep 342. Both substeps 341 and 342 are successively performed, the one or the other substep first.

When information comes from mobile user equipment 4 of first network, for example request of file download, information first goes from main base station 6 to said another neighbour base station 8 of second network through air interface and then information goes from said another neighbour base station 8 of second network to core network 9 of first network through backhaul between said another neighbour base station 8 of second network and core network 9 of first network.

When information comes to mobile user equipment 4 of first network, for example effective down of requested file, information first goes from core network 9 of first network to said another neighbour base station 8 through backhaul between said another neighbour base station 8 of second network and core network 9 of first network, and then goes from said another neighbour base station 8 of second network to main base station 6 through air interface.

Preferably, communicating through backhaul between said another neighbour base station 8 of second network and core network 9 of first network includes communicating through core network 10 of second network.

While using air interface, main base station 6 of first network, when communicating with neighbour base station 8 of second network, avoids loading own backhaul which is already very loaded, even sometimes more or less close to be overloaded. Main base station 6 communicates with said another neighbour base station 8 of second network through air interface, acting as a user equipment of second network.

Figure 4:
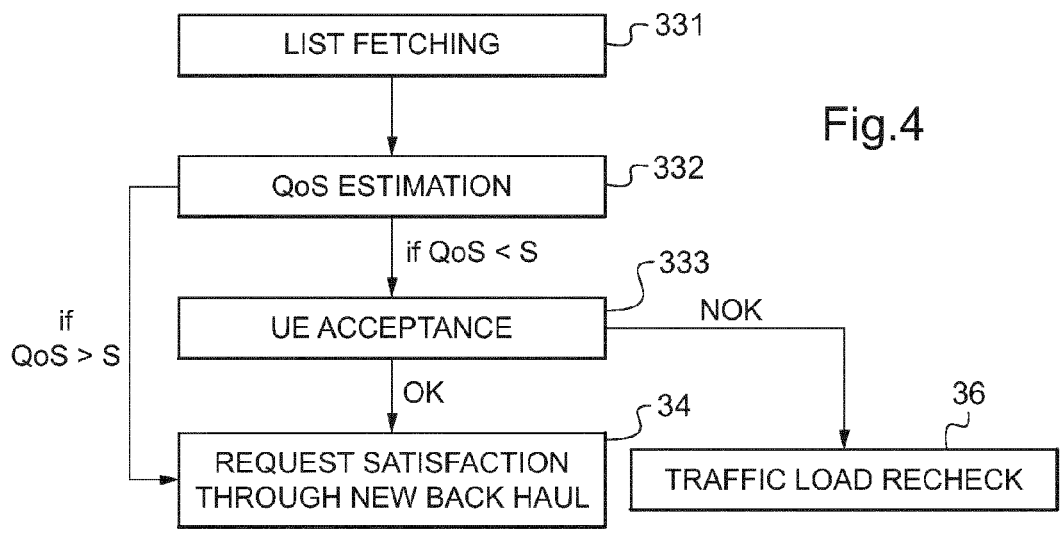
FIG. 4 shows an example of detailed substeps of another step of method shown on FIG. 2.

FIG. 4 shows an example of detailed substeps of another step of method shown on FIG. 2. Step 33 of FIG. 2 may comprise several substeps. Among them, a "list fetching" substep 331, a "QoS backhaul estimation" substep 332, a "UE acceptance" substep 333. Step 33 may start with substep 331.

In substep 331, the main base station 6 or the core network 9 of first network goes and fetches a list of available neighbour base stations 7 or 8 of at least a second network with associated offered qualities of service for their backhauls. We have already seen in FIG. 1 that this list is stored, updated, and provided by an operation, administration and maintenance center 21 sending it through core network 9 of first network. Main base station 6 of first network asks this list to core network 9 of first network. This list can of course contain more available base stations of second network or even available base stations of a third network or of other networks. At end of step 331, we go to substep 332.

Providing more than one possibility for backhaul sharing to main base station 6 of first network and implementing clever strategies to choose among possibilities helps maintaining a steady flow in the whole networks.

In substep 332, the main base station 6 or core network 9 of first network tries to select another neighbour base station 8 of second network by choosing, in the list of available neighbour base stations 7 and 8 of second network with associated offered qualities of service, preferably the available neighbour base station with the best quality of service for its backhaul, which is in our present case neighbour base station 8 of second network. In that way, the maximum effort is done to satisfy required quality of service of request transmitted by main base station 6 of first network despite the inter network backhaul drift.

A neighbour base station 7 or 8 is considered available when it is available to satisfy a new request, for example when effective traffic load of its backhaul is neither congested nor close to become congested.

In an alternative embodiment, main base station 6 or core network 9 of first network tries to select another neighbour base station of second network by choosing, in the list of available neighbour base stations 7 or 8 of second network with associated offered qualities of service for their backhauls, the available neighbour base station with the lowest quality of service, as long as this lowest quality of service is above the minimum quality of service required by the request to be satisfied. In this way, if later on, this main base station or another base station of first network needs also to benefit from a backhaul resource sharing but this time with another request requiring a highest quality of service, this can be done in an easier way.

In another alternative embodiment, main base station 6 or core network 9 of first network tries to select another neighbour base station of second network by choosing, in the list of available neighbour base stations 7 or 8 of second network with associated offered qualities of service for their backhauls, the available neighbour base station which has both a sufficient quality of service, that is to say a level of quality of service which is above the minimum quality of service required by the request to be satisfied, and the lowest effective traffic load on its backhaul. In this way, the risk that a base station of second network, sharing its backhaul with a base station of first network, becomes overloaded and for example needs itself to drift its backhaul traffic load, is more efficiently reduced.

Many other strategies may be applied in the selection of alternative base station. For example, one might apply a random selection among the available base stations having a sufficient QoS.

Anyway, either main base station 6 of first network can find another available neighbour base station 8 of second network with quality of service sufficient to meet requirements of request, or it cannot. If offered quality of service of intended to be chosen neighbour base station is above a threshold S corresponding to requirements of request, then we go to step 34 already known. If offered quality of service of intended to be chosen neighbour base station is below a threshold S corresponding to requirements of request, then we go to substep 333.

In substep 333, quality of service of neighbour base station intended to be chosen being below the minimum quality of service required by the request to be satisfied, main base station 6 of first network or core network 9 of first network requires acceptance of mobile user equipment 4 having issued the request. In that way, mobile user equipment has the lead on negotiated quality of service of its request.

A similar procedure for acceptance of a lower quality of service for mobile user equipment 4 may, in some embodiments, be applied also in step 36 and/or in step 32 in relation to the quality of service offered by the backhaul of the base station of the first network.

Mobile user equipment 4 can accept or refuse this quality of service degradation to satisfy its request. If mobile user equipment 4 accepts quality of service degradation, then we go to step 34 already known, "request satisfaction through new backhaul". If mobile user equipment 4 refuses quality of service degradation, then we go to step 36 already known, "traffic load recheck".

When a neighbour base station 8 of second network accepts to share its backhaul with main base station 6 of first network, said neighbour base station 8 of second network typically (but not necessarily) gives priority to requests from or to mobile user equipments 2 or 3 of second network over the request to be satisfied by main base station 6 of first network. In this way, sharing backhaul capacities with base stations 5 or 6 of other networks does not impede own backhaul traffic load of selected neighbour base station 8 of second network, or in the least reduces the intrusive effect of this sharing.

In an embodiment, this priority management may be implemented in a processing that runs as follows: when too many requests from or to mobile user equipments 2 or 3 of second network need backhaul use of the neighbour base station 8 of second network, this neighbour base station 8 stops sharing its backhaul with main base station 6 of first network. This stop can be forecast in order to give enough time to main base station 6 of first network to find another solution to continue satisfying the request it has started to satisfy while sharing backhaul of this neighbour base station 8 of second network.

In an alternative embodiment, this priority management may be implemented in a processing that runs as follows : any neighbour base station 8 of second network only accepts to share a minor part of its backhaul total capacities with main base station 6 of first network (or indeed with any other base station 5 or 6 of any other network). The total amount of backhaul capacities that a neighbour base station 8 can share with base stations 5 or 6 of other networks is a minor part of its backhaul total capacities. This sharable, with base stations 5 or 6 of other networks, amount of capacities could by way of example range from 10% to 30% of backhaul total capacities of this neighbour base station 8 of second network.

For priority management to be implemented, it is useful for neighbour base station 8 of second network to be able to make the difference between a call of a "normal" mobile user equipment 2 or 3 of second network on the one side and a call of a "main base station" 6 of first network, acting as a mobile user equipment of second network.

One way to make this difference could run as follows: when main base station 6 of first network calls neighbour base station 8 of second network, while acting as a mobile user equipment of second network, in order to ask for backhaul sharing, it could take advantage of the "spare bit" of an "EPS attach type information" (as described in section 9.9.3.11 of document TS 24.301 of the 3GPP specification), EPS standing for Evolved Packet System. One value of this spare bit would mean that another base station 6 is calling while the other value of this spare bit would mean that an ordinary mobile user equipment 2 or 3 is calling.

Figure 5:
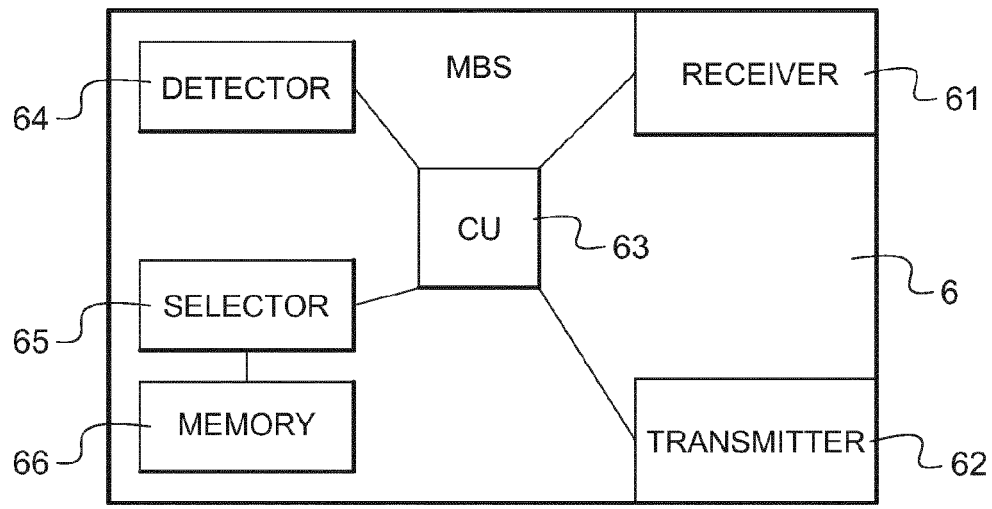
FIG. 5 shows an example of main base station according to one embodiment of the invention.

FIG. 5 shows an example of main base station according to one embodiment of the invention. Main base station 6 of first network comprising mobile user equipments 1 and 4, base stations 5 and 6 and a core network 9, comprises a receiver 61, a traffic load detector 64, a selector 65, a transmitter 62, and a central unit 63 making all preceding elements working together. The main base station 6 of FIG. 5 may, for example, be configured to perform appropriate method steps according to one or more FIGS. 2 through 4.

The receiver 61 receives a request from or to mobile user equipment 4.

The traffic load detector 64 checks if received request can be satisfied through own backhaul according to traffic load. The traffic load detector 64 includes a threshold comparator configured to be able to compare effective traffic load to a predetermined maximum traffic load threshold.

The selector 65 tries and selects another neighbour base station 8 of second network according at least to availability and to offered quality of service of said another neighbour base station 8, if detection performed by detector 64 result is that received request cannot be satisfied trough own backhaul. The selector 65 includes a controller able to select a neighbour base station among other available neighbour base stations, according to their respective qualities of service and or their respective effective traffic loads. The selector 65 may be associated to a memory 66 in which are stored the formulas that are used to implement the strategy with respect to the way of choosing a neighbour base station among other available neighbour base stations.

The transmitter 62 and the receiver 61 communicate through backhaul between selected neighbour base station 8 of second network and core network 9 of first network to satisfy received request, if selection performed by selector 65 has been successful.

In a preferred embodiment, main base station 6 is an eNodeB of a E-UTRAN.

Figure 6:
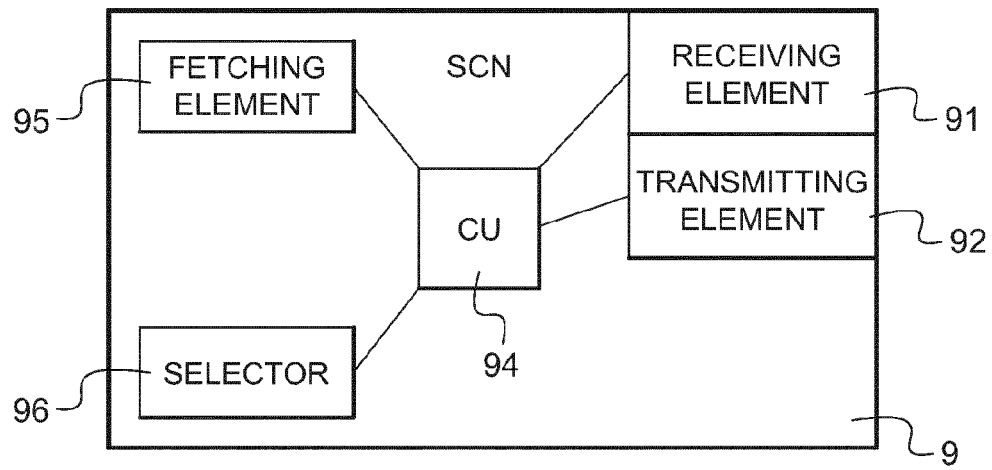
FIG. 6 shows an example of a subsystem of core network according to one embodiment of to the invention.

FIG. 6 shows an example of a subsystem SCN of core network according to an embodiment of the invention. The subsystem of core network 9 comprises a receiving element 91, a transmitting element 92, a fetching element 95, a selector 96, and a central unit 94 making all preceding elements working together. The subsystem of core network 9 of FIG. 6 may, for example, be configured to perform appropriate method steps according to one or more FIGS. 2 through 4.

The receiving element 91 receives a demand from a base station 6 of first network. The fetching element 95 gets a list of available neighbour base stations 7 and 8 of second network and associated offered qualities of service. The fetching element 95 is configured to be able to get said list from an operation, administration and maintenance center 21. The transmitting element 92 sends said list to said base station 6 of first network as an answer to said demand. The selector 96 tries and selects another neighbour base station 8 in said list.

Receiving element 91 and transmitting element 92 communicate afterwards with said base station 8 of first network through backhaul between core network 9 of first network and base station 8 selected from said list.

The transmitting element 92 and the selector 96 are configured such that either operation of transmitting element 92 sending said list or operation of selector 96 trying to select said another neighbour base station 8 can be performed, but both operations cannot be performed for the same demand.

In a preferred embodiment, the subsystem or core network 9 of first network is a serving gateway (SGW) of a E-UTRAN.

Figure 7:
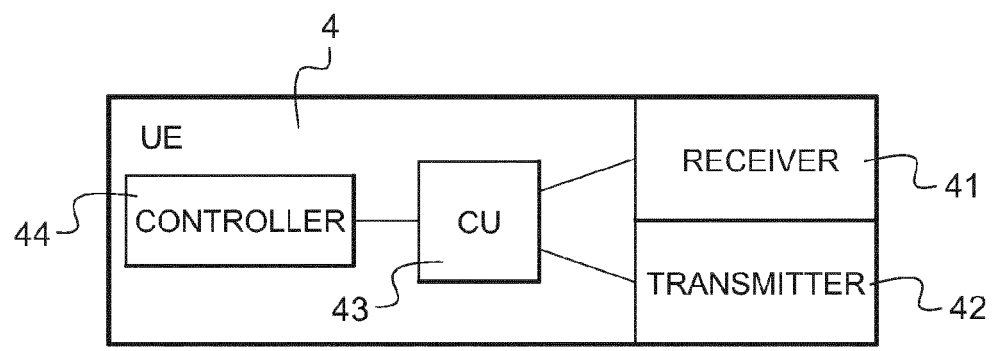
FIG. 7 shows an example of a mobile user equipment according to one embodiment of to the invention.

FIG. 7 shows an example of a mobile user equipment according to an embodiment of the invention. Mobile user equipment 4 comprises: a receiver 41, a transmitter 42, a controller 44, and a central unit 43 making all preceding elements working together. The mobile user equipment 4 of FIG. 7 may, for example, be configured to perform appropriate method steps according to one or more FIGS. 2 through 4.

The transmitter 42 sends a request to a base station 6 of first network. The receiver 41 receives a quality of service degradation proposal from the base station 6 of first network according to excessive traffic load on backhaul of said base station 6 of first network. The controller 44 checks if said degradation proposal is acceptable for said request. The transmitter 42 sends an acceptance message or a refusal message depending on checking result of controller 44.

The invention has been described with reference to preferred embodiments. However, many variations are possible within the scope of the invention.

The invention claimed is:

1. A method of communication in a cellular communication network that includes a first cellular network and a second cellular network, comprising:
   receiving, at a main base station of the first cellular network, a request from or to a mobile user equipment of the first cellular network;
   determining, by the main base station, if the request can be satisfied through the main base station's own backhaul based on traffic load by comparing an effective traffic load to a predetermined maximum traffic load threshold; and
   if the request cannot be satisfied through the main base station's own backhaul:
      attempting, by the main base station or a core network of the first cellular network, to select a neighbor base station of at least a second cellular network that is different from the first cellular network, based on at least one of an availability of a backhaul of the neighbor base station, and an offered quality of service of the backhaul of the neighbor base station; and
      if the attempt is successful, communicating between the main base station and the core network of the first cellular network via a backhaul of the neighbor base station to satisfy the request.

2. The method of claim 1, wherein said communicating between the main base station and the core network of the first cellular network via the backhaul of the neighbor base station comprises:
   communicating between the main base station and the neighbor base station through an air interface; and
   communicating between the main base station and the core network of the first cellular network via both the backhaul of the neighbor base station and the core network of the second network.

3. The method of claim 2, wherein said communicating between the main base station and the core network of the first cellular network via the backhaul of the neighbor base station comprises the main base station communicating with the neighbor base station through the air interface, acting as a user equipment of the second cellular network.

4. The method of claim 1, wherein said attempting to select the neighbor base station of at least the second cellular network that is different from the first cellular network comprises choosing the neighbor base station from a list that indicates available neighbor base stations of at least the second cellular network and associated offered qualities of service of those neighbor stations.

5. The method of claim 4, wherein said attempting to select the neighbor base station of at least the second cellular network that is different from the first cellular network comprises choosing, from the list of available neighbor base stations, the available neighbor base station with the best quality of service.

6. The method of claim 4, wherein said attempting to select the neighbor base station of at least the second cellular network that is different from the first cellular network comprises requesting acceptance of the mobile user equipment if the quality of service of the neighbor base station intended to be chosen is below a minimum quality of service required to satisfy the request.

7. A method of communication, comprising:
   if a request from or to a mobile user equipment cannot be satisfied by a base station of a first cellular network through its own backhaul according to a traffic load of the backhaul, as determined by comparing an effective traffic load to a predetermined maximum traffic load threshold, attempting to satisfy the request through backhaul of a neighbor base station of a second cellular network that is different from the first cellular network; and
   selecting the neighbor base station based on availability of the backhaul of the neighbor base station, a quality of service offered by the backhaul of the neighbor base station, or both.

8. A main base station in a main cellular network which includes mobile user equipment, base stations, and a core network, comprising circuitry configured as:
   a receiver configured to receive a request from or to a mobile user equipment;
   a traffic load detector configured to check if the request can be satisfied through the main base station's own backhaul based on detected traffic load by comparing an effective traffic load to a predetermined maximum traffic load threshold;

a selector configured to, if the request cannot be satisfied through the base station's own backhaul, attempt to select a neighbor base station of at least another cellular network based on availability and offered quality of service of a backhaul of the neighbor base station; and a transmitter and a receiver, both configured to, if the attempt is successful, communicate with a core network of the main cellular network via the backhaul of the neighbor base station.

9. The main base station of claim 8, wherein the main base station is an eNodeB of an Evolved Universal Mobile Telecommunications System (UMTS) or Terrestrial Radio Access Network (E-UTRAN).

10. A subsystem of a main core network of a main cellular network that includes mobile user equipment, base stations, and the main core network, the subsystem comprising circuitry configured as:

a receiver configured to receive a demand from a base station;

a fetching element configured to obtain a list that indicates available neighbor base stations of at least another cellular network and their associated offered qualities of service;

a transmitter configured to send the list to the base station of the main cellular network as an answer to the demand; and a selector configured attempt to select a neighbor base station in the list;

wherein the receiver and transmitter are configured to subsequently communicate with the base station of the main cellular network through a backhaul between the main core network and the base station selected from the list; and wherein the transmitter and selector are configured such that either the transmitter sending the list or the selector trying to select the neighbor base station, but not both, can perform their respective operation, for the same demand.

11. The subsystem of claim 10, wherein the subsystem is a serving gateway of a Evolved Universal Mobile Telecommunications System (UMTS) or Terrestrial Radio Access Network (E-UTRAN).

12. The subsystem of claim 11, wherein the fetching element is configured to obtain the list from an Operations, Administration, and Management (OAM) center.

13. A main mobile user equipment for a main cellular network that includes mobile user equipment, base stations, and a core network, comprising circuitry configured as:

a transmitter configured to transmit a request to a base station;

a receiver configured to receive a quality of service degradation proposal from the base station according to excessive traffic load on backhaul of said base station as ascertained by comparing an effective traffic load to a predetermined maximum traffic load threshold; and a controller configured to determine if the degradation proposal is acceptable for the request;

wherein the transmitter is further configured to send an acceptance message or a refusal message depending on the determination.

14. A computer program product stored in a non-transitory computer-readable medium, the computer program product comprising software instructions which, when run by a base station in a cellular communication network, configures the base station to:

receive a request from or to a mobile user equipment of a first cellular network;

determine if the request can be satisfied through the main base station's own backhaul based on traffic load by comparing an effective traffic load to a predetermined maximum traffic load threshold; and if the request cannot be satisfied through the main base station's own backhaul:

attempt to select a neighbor base station of at least a second cellular network that is different from the first cellular network, based on availability of a backhaul of the neighbor base station, offered quality of service of the backhaul of the neighbor base station, or both; and if the attempt is successful, communicate between the main base station and the core network of the first cellular network via a backhaul of the neighbor base station to satisfy the request.

* * * * *